United States Patent Office
3,642,674
Patented Feb. 15, 1972

3,642,674
ADDUCTS, CONTAINING EPOXIDE GROUPS, FROM POLYEPOXIDE COMPOUNDS AND ACID POLYESTERS OF ALIPHATIC CYCLO-ALIPHATIC DICARBOXYLIC ACIDS
Rolf Schmid, Reinach, Basel-Land, Friedrich Lohse, Allschwil, Willy Fisch, Binningen, and Hans Batzer, Arlesheim, Switzerland, assignors to Ciba Limited, Basel, Switzerland
No Drawing. Filed June 10, 1969, Ser. No. 832,004
Claims priority, application Switzerland, June 19, 1968, 9,097/68; July 19, 1968, 10,813/68
Int. Cl. C08f 21/04; C08g 17/16; C08h 9/00; C09d 3/64
U.S. Cl. 260—22 EP
16 Claims

ABSTRACT OF THE DISCLOSURE

New adducts containing epoxide groups are formed when (1) cycloaliphatic polyepoxide compounds which possess at least one 1,2-epoxide group located on a carbocyclic five-membered or six-membered ring, and (2) acid polyesters, obtained by esterification with aliphatic diols, of aliphatic-cycloaliphatic higher dicarboxylic acids (prepared by dimerization of unsaturated monomeric fatty acid having 14 to 24 carbon atoms in the molecule, preferably 16 to 18, and, if desired or required, subsequent hydrogenation of such a dimeric fatty acid), are reacted at an elevated temperature to form an adduct 0.1 to 0.5 carboxyl group equivalents of the acid polyester are used per 1 epoxide group equivalent of the polyepoxide compound. Curing of these advanced epoxide compounds with carboxylic acid anhydrides gives flexible, impact-resistant shaped bodies the mechanical properties of which are largely independent of the temperature.

It is known that polyepoxide compounds can be cured with carboxylic acid anhydrides to give moulded materials distinguished by high mechanical strength, heat resistance and dielectric strength. For many uses the relatively low flexibility of such moulded materials is inadequate. It is known that the flexibility can be increased by the addition of plasticisers such as polyethylene glycol, polypropylene glycol or polyesters having terminal carboxyl and/or hydroxyl groups. Cured products which in part show significantly higher deflection and elongation as break are obtained in this manner. These known flexible moulded materials however suffer from some serious disadvantages. The mechanical and dielectric values are very poor. The values decline rapidly even for a slight rise in temperature, and the moulded articles rapidly absorb major amounts of water in a moist atmosphere, even at room temperature, which also worsens the dielectric properties; even the moulded materials which are still very flexible at room temperature rapidly show a severe embrittlement at lower temperatures.

It is further known from Swiss patent specification No. 441,752 to obtain moulded articles with relatively good dielectric properties by reaction of acid polyesters from dimerized fatty acid and ε-caprolactone with epoxide resins. The physical properties of the formulations mentioned, and especially the mechanical strength values of such moulded articles, are however still very greatly temperature-dependent. The moulded articles produced have a very low mechanical strength at slightly elevated temperature and in most cases even at room temperature.

It has now been found that by (so-called) "advancement" of certain cycloaliphatic polyepoxides with acid polyesters of special structure, derived from dimerized fatty acids, in certain stiochiometric quantity ratios, novel plasticized curable epoxide resins are obtained which can be converted, by curing with polycarboxylic acids or polycarboxylic acid anhydrides, preferably carbocyclic carboxylic acid anhydrides, into flexible impact-resistant moulded articles which surprisingly do not show the above-mentioned disadvantages of the previously known flexible moulded materials or show them to a greatly reduced extent; in particular, the mechanical properties of the new moulded materials are largely independent of the temperature. As is particularly shown by the measurements of the modulus of shear at various temperatures according to DIN 53,445, the mechanical strength and the resistance to deformation of the new moulded materials remain preserved up to temperatures above 140° C. Nevertheless the moulded articles still possess good flexibility and impact strength at temperatures below 0° C. The moulded articles according to the invention are distinguished by low water absorption as well as by excellent dielectric properties even at elevated temperature and after storage in water. Both the harder and the softer moulded articles show elastic behaviour and possess a pronounced high recoil force and show only slight damping and practically no permanent deformation. This opens up entirely new vistas for the industrial use of these new plasticized epoxide resins, especially in the field of casting, impregnating and laminating resins, adhesives and compression moulding compositions.

The acid polyesters derived from dimerized fatty acids which are used for the (so-called) "advancement" of polyepoxide compounds must fulfil very particular structural prerequisites.

Furthermore 0.1 to at most 0.5 carboxyl group equivalents of the acid polyester must be employed per 1 equivalent of epoxide groups of the polyepoxide compound for the (so-called) "advancement." Best results are achieved when using 0.2 to at most 0.4 carboxyl group equivalents of the acid polyester.

The subject of the invention is thus new adducts, containing epoxide groups, from polyepoxide compounds and acid polyesters, which are obtained by reacting acid polyesters of formula

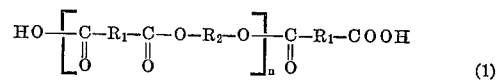

(1)

wherein $R_1$ denotes the hydrocarbon residue of an unsaturated aliphatic-cycloaliphatic higher dicarboxylic acid which has been manufactured by dimerization of unsaturated monomeric fatty acid having 14 to 24 carbon atoms in the molecule, preferably 16 to 18 carbon atoms, and optionally subsequent hydrogenation of such a dimeric fatty acid, $R_2$ denotes a residue of an aliphatic diol obtained by removal of the two hydroxyl groups and $n$ denotes an integer from 1 to 20, preferably 2 to 6, with warming, with cycloaliphatic polyepoxide compounds which possess at least one 1,2-epoxide group located on a carbocyclic 5-membered or 6-membered ring, with the formation of an adduct, 0.1 to 0.5, preferably 0.2 to 0.4, equivalents of the acid polyester being employed per one equivalent of epoxide groups.

The cycloaliphatic polyepoxide compounds used for the manufacture of the new adducts containing epoxide groups are preferably those particular types which on being cured alone with polycarboxylic acid anhydrides, such as phthalic anhydride or hexahydrophthalic anhydride, yield cured moulded materials having a heat distortion point according to Martens, DIN 53,458, of at least 90° C., and preferably of at least 140° C.

The use of aromatic polyepoxide compounds, which is here not claimed, such as of the diglycidyl compounds of bisphenol A ("diomethane") admittedly also leads to products of high flexibility, good dielectric properties and low water absoprtion. These diglycidyl compounds are however in most cases not compatible with the acid polyesters mentioned (demixing) and the mechanical strength values of the moulded articles decline more rapidly as the temperature rises. The good temperature resistance is also noticeably reduced when using aliphatic linear polycarboxylic acid anhydrides as curing agents.

As cycloaliphatic polyepoxide compounds possessing at least one six-membered ring to which a 1,2-epoxide group is bonded there may be mentioned:

Limonene diepoxide, vinylclohexene diepoxide, cyclohexadiene diepoxide; bis(3,4-epoxycyclohexyl)dimethylmethane.

Epoxycyclohexylmethyl ethers of glycols or hydroxyalkylene glycols, such as diethylene glycol-bis(3,4-epoxy-6-methyl-cyclohexylmethyl) ether;
ethylene glycol-bis(3,4-epoxy-cyclohexylmethyl) ether, 1,4-butanediol-bis(3′,4′-epoxy-cyclohexylmethyl) ether; (3,4-epoxycyclohexylmethyl)glycidyl ether;
(3,4-epoxychlorohexyl)glycidyl ether, ethylene glycol-bis-3,4-epoxycyclohexyl ether, 1,4-butanediol-bis(3′,4′-epoxycyclohexyl) ether, p-hydroxylphenyl-dimethyl-methane-bis(3,4-epoxycyclohexyl) ether;
bis(3,4-epoxycyclohexyl) ether;
(3′,4′-epoxycyclohexylmethyl)-3,4-epoxycyclohexyl ether;
3,4-epoxycyclohexane-1,1-dimethanoldiglycidyl ether.

Epoxycyclohexane-1,2-dicarboximides such as N,N′-ethylene diamine-bis(4,5-epoxycyclohexane-1,2-dicarboximide); epoxycyclohexylmethyl-carbamates such as bis (3, 4-epoxycyclohexylmethyl)-1,3-toluylene-dicarbamate.

Epoxycyclohexanecarboxylates of aliphatic polyols such as 3-methyl-1,5-pentanediol-bis(3,4-epoxycyclohexane-carboxylate),
1,5-pentanediol-bis(3,4-epoxycyclohexane-carboxylate),
ethylene glycol-bis(3,4-epoxycyclohexane-carboxylate),
2,2-diethyl-1,3-propanediol-bis(3′,4′-epoxy-cyclohexane-carboxylate),
1,6-hexanediol-bis(3′,4′-epoxycyclohexane-carboxylate),
2-butene-1,4-diol-bis(3′,4′-epoxycyclohexanecarboxylate),
2-butene-1,4-diol-bis(3′,4′-epoxy-6′-methyl-cyclohexane-carboxylate),
1,1,1-trimethylolpropane-tris-(3′,4′-epoxycyclohexane-carboxylate),
1,2,3-propanetriol-tris(3′,4′-epoxy-cyclohexane-carboxylate);

epoxycyclohexane-carboxylates of hydroxyalkylene glycols, such as diethylene glycol-bis(3,4-epoxy-6-methyl-cyclohexane - carboxylate), triethylene glycol - bis(3,4-epoxycyclohexanecarboxylate).

Epoxycyclohexylalkyl-dicarboxylic acid esters, such as bis(3,4-epoxycyclohexylmethyl)maleate,
bis(3,4-epoxycyclohexylmethyl)-oxalate,
bis(3,4-epoxy-cyclohexylmethyl)pimelate,
bis(3,4-epoxy-6-methylcyclohexylmethyl)succinate,
bis(3,4-epoxycyclohexylmethyl)adipate,
bis(3,4-epoxy-6-methylcyclohexylmethyl)-adipate,
bis(3,4-epoxy-6-methylcyclohexylmethyl)sebacate,
bis(3,4-epoxycyclohexylmethyl)terephthalate,
bis(3,4-epoxy-6-methylcyclohexylmethyl)terephthalate.

Epoxycyclohexyl-carboxylic acid esters such as bis(3,4-epoxy-cyclohexyl)succinate,
bis(3,4-epoxycyclohexyl)adipate,
bis(3,4-epoxycyclohexyl)carbonate,
(3′,4′-epoxycyclohexyl)-3,4-epoxycyclohexanecarboxylate,
3′,4′-epoxycyclohexylmethyl-9,10-epoxystearate;
2′,2″-sulphonyldiethanol-bis(3,4-epoxycyclohexane-carboxylate);
bis(3,4-epoxycyclohexylmethyl)carbonate.

Further, there may especially be mentioned the 3,4-epoxycyclohexanecarboxylates of 3,4-epoxycyclohexyl-methanols such as for example 3′,4′-epoxy-2′-methyl-cyclohexylmethyl)-3,4-epoxy-2-methyl-cyclohexanecarboxylate,
(1′-chloro13′,4′-epoxycyclohexyl)-1-chlor-3,4-epoxy-cyclohexanecarboxylate,
(1′-chlor-3′,4′-epoxycyclohexyl)-1-chlor-3,4-epoxy-epoxycyclohexanecarboxylate, and amongst those which are particularly suitable, for example those of the formulae:

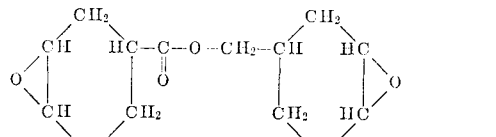

(=3′,4′-epoxycyclohexylmethyl - 3,4 - epoxycyclohexanecarboxylate, and

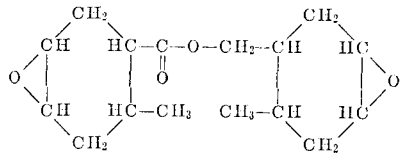

(=3′,4′-epoxy-6′-methylcyclohexylmethyl - 3,4 - epoxy-6-methylcyclohexanecarboxylate).

Acetals and ketals possessing epoxycyclohexane groups such as bis(3,4-epoxy-6-methylcyclohexylmethyl)carbonate;
3,4-epoxy-6-methyl-cyclohexanecarboxaldehyde-bis(3,4-epoxy-6-methylcyclohexylmethyl)acetal;
bis(3,4-epoxy-cyclohexylmethyl)formal, bis(3,4-epoxy-6-methyl-cyclohexylmethyl)formal;
benzaldehyde-bis(3,4-epoxycyclohexylmethyl)acetal,
acetaldehyde-bis(3,4-epoxycyclohexylmethyl)acetal,
acetone-bis(3,4-epoxycyclohexylmethyl)ketal,
glyoxal-tetrakis(3,4-epoxycyclohexylmethyl)-acetal;
bis(3,4-epoxyhexahydrobenzal)-D-sorbitol;
bis(3,4-epoxyhexahydrobenzal)pentaerythritol (=3,9-bis(3,4-epoxycyclohexyl)spirobi(metadioxane)),
bis(3,4-epoxy-6-methylhexahydrobenzal)pentaerythritol;
3-(3′,4′-epoxycyclohexyl-methyl-oxyethyl)-2,4-dioxaspiro(5.5)-8,9-epoxyundecane, 3-(3′,4′-epoxycyclohexylmethyloxy-(2′)-propyl)-2,4-dioxaspiro(5.5)-8,9-epoxyundecane;
3,9-bis(3′,4′-epoxycyclohexylmethyloxyethyl)spirobi(m-dioxane);
3-(2′,3′-epoxypropyloxyethyl)-2,4-dioxaspiro(5.5)-8,9-epoxyundecane;
ethylene glycol-bis-2′(2,4-dioxaspiro(5.5)-8,9-epoxy-undecyl-3)ethyl ether, polyethylene glycol-bis-2′(2,4-dioxaspiro(5.5)-8,9-epoxyundecyl-3)ethyl ether, 1,4-butanediol-bis-2′(2,4-dioxaspiro(5.5)-8,9-epoxy-undecyl-3)ethyl ether, trans-quinitol-bis-2′(2,4-dioxaspiro(5.5)-8,9-epoxyundecyl-3)ethyl ether, bis-2,4-dioxaspiro(5.5)-8,9-epoxyundecyl-3)ether, 3,4-epoxyhexahydrobenzaldehyde(1′-glycidyloxyglycerine-2′,3′)-acetal, and among those which are particularly suitable for example those of the formulae:

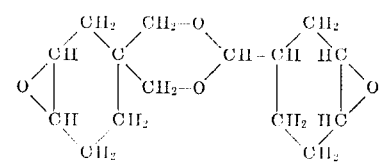

(3-(3',4'-epoxycyclohexyl) - 8,9 - epoxy - 2,4 - dioxaspiro-[5.5]undecane) and of the formula

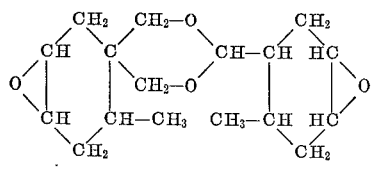

(3-(3',4'-epoxy - 6' - methylcyclohexyl) - 8,9 - epoxy - 11-methyl-2,4-dioxaspiro[5.5]undecane).

As cycloaliphatic polyepoxide compounds possessing at least one five-membered ring to which a 1,2-epoxide group is bonded there may be mentioned:

dicyclopentadiene diepoxide,
glycidyl-2,3-epoxycyclopentyl ether,
bis(cyclopentenyl) ether diepoxide,
2,3-epoxybutyl-2,3-epoxycyclopentyl ether,
epoxypentyl-2,3-epoxycyclopentyl ether,
9,10-epoxystearyl-2,3-cyclopentyl ether,
3,4-epoxycyclohexylmethyl-2,3-cyclopentyl ether,
2,2,5,5-tetramethyl-3,4-epoxycyclohexylmethyl-2,3-cyclopentyl ether,
2,2,5,5,6-pentamethyl-3,4-epoxycyclohexylmethyl-2,3-epoxycyclopentyl ether;
2,3-epoxycyclopentyl-9,19-epoxystearate,
2,3-epoxycyclopentyl-3,4-epoxycyclohexylcarboxylate,
2,3-epoxycyclopentyl-2,2,5,5-tetramethyl-3,4-epoxycyclohexylcarboxylate;
(3',4'-epoxy-2',5'-endomethylene-cyclohexylmethyl)-3,4-epoxy-2,5-endomethylene-cyclohexanecarboxylate,
bis(3,4-epoxy-2,5-endomethylene-cyclohexylmethyl)succinate;
bis(3,4-epoxy-2,5-endomethylene-cyclohexylmethyl) formal,
bis(3,4-epoxy-2,5-endomethylene-hexahydrobenzal) pentaerythritol,
3-(3',4'-epoxy-2',5'-endomethylenecyclohexylmethyl)-9,10-epoxy-2,4-dioxaspiro(5.5)undecane;
bis(3-oxatricyclo[3.2.1.0²,⁴]-oct-6-yl)carbonate,
bis(3-oxatricyclo₁3.2.1.0²,⁴]-oct-6-yl)-succinate,
(3-oxatricyclo[3.2.1.0²,⁴]-oct-6-yl)-3,4-epoxy-cyclohexylcarboxylate,
(3-oxatricyclo[3.2.1.0²,⁴]-oct-6-yl)-9,10-epoxyoctadecanoate;

further, especially, epoxidized ethers and esters of dihydrodicyclopentadien-8-ol, such as (4-oxatetracyclo[6.2.1.0²,⁷0³,⁵]hendec-9-yl)glycidyl ether,
(4-oxatetracyclo[6.2.1.0²,⁷0³,⁵]hendec-9-yl)-2,3-epoxybutyl ether,
(4-oxatetracyclo[6.2.1.0²,⁷0³,⁵]hendec-9-yl)-6-methyl-3,4-epoxycyclohexylmethyl ether,
(4-oxatetracyclo[6.2.1.0²,⁷0³,⁵]hendec-9-yl)-3,4-epoxycyclohexyl ether,
(4-oxatetracyclo[6.2.1.0²,⁷0³,⁵]hendec-9-yl)-3-oxatricyclo(3.2.1.0²,⁴)oct-6-yl ether,
(4-oxatetracyclo[6.2.1.0²,⁷0³,⁵]hendec-9-yl)-3,4-epoxy-2,5-endomethylene-cyclohexylmethyl) ether;
ethylene glycol-bis(4-oxatetracyclo[6.2.1.0²,⁷0³,⁵]hendec-9-yl) ether,
diethyleneglycol-bis(4-oxatetracyclo[6.2.1.0²,⁷0³,⁵]hendec-9-yl ether,
1,3-propylene glycol-bis(4-oxatetracyclo[6.2.1.0²,⁷0³,⁵] hendec-9-yl) ether,
glycerine-bis(4-oxatetracyclo(6.2.1.0²,⁷0³,⁵]hendec-9-yl) ether;
bis(4-oxatetracyclo[6.2.1.0²,⁷0³,⁵]hendec-9-yl) ether;
bis(4-oxatetracyclo[6.2.1.0²,⁷0³,⁵]hendec-9-yl)formal;
bis(4-oxatetracyclo[6.2.1.0²,⁷0³,⁵]hendec-9-yl)succinate;
bis(4-oxatetracyclo[6.2.1.0²,⁷0³,⁵]hendec-9-yl)maleate;
bis(4-oxatetracyclo[6.2.1.0²,⁷0³,⁵]hendec-9-yl)phthalate;
bis(4-oxatetracyclo[6.2.1.0²,⁷0³,⁵]hendec-9-yl)adipate;
bis(4-oxatetracyclo[6.2.1.0²,⁷0³,⁵]hendec-9-yl)sebacate;
tris(4-oxatetracyclo[6.2.1.0²,⁷0³,⁵]hendec-9-yl)trimellitate;
9,10-epoxy-octadecane-acid[4-oxatetracyclo(6.2.1.0²,⁷-0³,⁵)hendec-9-yl]ester and
9,10,12,13-diepoxyoctadecane-acid-(4-oxatetracyclo-[6.2.1.0²,⁷0³,⁵]hendec-9-yl) ester.

It is also possible to use mixture of such cycloaliphatic epoxide resins.

The dicarboxylic acids of Formula I used for the manufacture of the new adducts according to the invention are acid polyesters having two terminal carboxyl groups, such as are obtained by polycondensation of aliphatic-cycloaliphatic higher dicarboxylic acids of the nature defined above with aliphatic diols.

The aliphatic-cycloaliphatic higher dicarboxylic acids which are suitable for the manufacture of the acid polyester are obtainable by dimerization of monomeric fatty acids having sufficiently functional double bonds or of fatty acids derived from drying or semi-drying oils.

Possible monomeric fatty acids of this nature are those containing 14 to 24 carbon atoms, preferably 16 to 18 carbon atoms, in the molecule and possessing at least one reactive double bond in the molecule, such as for example oleic acid, linoleic acid, linolenic acid, ricinic acid as well as fatty acids containing hydroxyl groups, such as for example ricinoleic acid.

As suitable semi-drying or drying oils from which such fatty acids are derived there may be mentioned: cottonseed oil, rape oil, safflower oil, sesame oil, sunflower oil, soya oil, tung oil, linseed oil, oiticica oil, perilla oil and the like.

In the known dimerization process for the manufacture of the aliphatic-cycloaliphatic dicarboxylic acids the fatty acids which must contain at least one double bond in the molecule mainly react to form an acid mixture which principally consists of dimeric, and to a lesser extent also of trimeric or higher molecular, constituents. The monomeric insufficiently functional acids are removed from the reaction mixture by distillation.

The aliphatic-cycloaliphatic dicarboxylic acids obtained by polymerisation, which are unsaturated to a certain degree, can, either directly or after a subsequently effected hydrogenation, be used for the manufacture of the acid polyesters.

The following compounds are preferentially used as aliphatic diols for the manufacture of the acid polyesters; ethylene glycol, 1,2- and 1,3-propanediol, 1,4-butanediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,6-dihydroxy-2,2,4-trimethylhexane and 1,6-dihydroxy-2,4,4-trimethylhexane.

The polyesters (I) can of course be manufactured by condensing a mixture of two or more diols, or by condensing a diol with a mixture of two or more of the above-defined dimeric (optionally hydrogenated) fatty acids in the correct stoichiometric quantity ratios. Alternatively, acid polyesters may be prepared by condensing a mixture of various dicarboxylic acids with a mixture of various diols.

It is also possible additionally to employ minor proportions of trivalent or polyvalent components in the manufacture of the polyesters (I), such as for example hexanetriol or trimerized fatty acid, tricarboxylic or tetracarboxylic acid, such as trimellitic acid anhydride or pyromellitic acid anhydride. The adducts which result from the reaction of polyester mixtures prepared in this way, which in addition to polyesters of Formula I further contain constituents of more strongly branched-chain polyesters having more than two terminal carboxyl groups, with the cycloaliphatic polyepoxides however yield moulded materials of analogous physical properties after cure, so that in most cases no further advantages manifest themselves as a result.

The adducts are as a rule manufactured by simply fusing together the polyepoxide compound and the acid polyester of Formula I in the prescribed stoichiometric quantity ratios. As a rule the temperature range of 100° to 200° C., preferably 130 to 180° C., is used for this.

The adducts containing epoxide groups, according to the invention, react with polycarboxylic acid anhydrides as curing agents to give novel moulded materials. Preferably curing agents are used which on reaction with only the polyepoxide used as the starting substance for the manufacture of the adducts (that is to say the unplasticized polyepoxide) yield cured moulded materials having a heat distortion point according to Martens DIN 53,458 of at least 90° C., and preferably of at least 140° C.

Such preferentially used curing agents are for example cycloaliphatic polycarboxylic acid anhydrides, such as $\Delta^4$ - tetrahydrophthalic anhydride, 4 - methyl - $\Delta^4$ - tetrahydrophthalic anhydride, hexahydrophthalic anhydride, 4-methylhexahydrophthalic anhydride, 3,6 - endomethylene - $\Delta^4$ - tetrahydrophthalic anhydride, 4 - methyl - 3,6-endomethylene-$\Delta^4$-tetrahydrophthalic anhydride (=methylnadicanhydride), and the Diels-Alder adduct from 2 mols of maleic anhydride and 1 mol of 1,4-bis(cyclopentadienyl)-2-butene, and also dodecenylsuccinic anhydride.

Accelerators such as tertiary amines, for example 2,4,6-tris(dimethylaminomethyl)phenol, or alkali metal alcoholates, for example sodium methylate or sodium hexylate, can be conjointly used when curing with anhydrides. When curing the adducts containing epoxide groups, according to the invention, with carboxylic acid anhydrides, 0.5 to 1.2 gram equivalents of anhydride groups are appropriately used per 1 gram equivalent of epoxide groups.

When curing adducts which have been prepared by reaction of 1 equivalent of epoxide groups of the diepoxide with more than 0.3 and at most 0.5 equivalent of carboxyl groups of the acid polyester it is as a rule advantageous if a proportion of a non-plasticized polyepoxide compound is added to the curable mixture; this polyepoxide compound can be identical with the polyepoxide used as the starting substance for the manufacture of the adduct. The added amount of non-plasticized polyepoxide should as a rule be such that for the curable mixture the quotient $M/N$, wherein M denotes the carboxyl group content of the acid polyester employed for the adduct formation, in equivalents/kg., and wherein N denotes the sum of (epoxide group content of the polyepoxide employed for the adduct formation, in equivalents/kg.)+(epoxide group content of the unplasticized polyepoxide subsequently added to the adduct), does not become greater than 0.3 and not become less than 0.02.

The term "cure" as used here denotes the conversion of the above diepoxides into insoluble and infusible crosslinked products, and indeed as a rule with simultaneous moulding to give moulded articles such as castings, pressings or laminates, or to give two-dimensional structures such as lacquer films or adhesive bonds.

A subject of the present invention is therefore also curable mixtures which are suitable for the manufacture of moulded articles, including two-dimensional structures, and which contain the adducts containing epoxide groups, according to the invention, optionally together with an unplasticised polyepoxide, as well as a curing agent for epoxide resins such as a polyamine or a polycarboxylic acid anhydride.

The adducts according to the invention, and/or their mixtures with other polyepoxide compounds and/or curing agents, can furthermore be mixed, in any stage before being cured, with fillers and reinforcing agents, pigments, dyestuffs, flameproofing substances or mould release agents.

Glass fibres, boron fibers, carbon fibres, mica, quartz powder, aluminium oxide trihydrate, gypsum, burnt kaolin or metal powders, such as aluminium powder, can for example be used as fillers and reinforcing agents.

The curable mixtures, in the unfilled or filled state, can especially serve as laminating resins, dipping resins, impregnating resins, casting resins or potting and insulating compositions for the electrical industry. They can furthermore be successfully employed for all other technical fields where epoxide resins are usually employed, for example as adhesives, glues, paints, lacquers, compression moulding composition and sintering powders.

In the examples which follow the percentages denote percentages by weight.

The following acid polyesters were used for the manufacture of adducts, containing epoxide groups, described in the examples:

(a) Manufacture of dimerized fatty acids

Manufacture of dimerized castor oil fatty acid.—1000 g. of castor oil fatty acid (octadeca-9,11-diene-acid) were kept for 10 hours at 260° C. in an autoclave under nitrogen. The resulting brown-coloured reaction mixtures was subsequently distilled so that the unreacted castor oil fatty acid (boiling point 178–187° C./8 mm. Hg) could be recovered in addition to a slight first run. 293.5 g. of crude dimerized fatty acid (also containing a proportion of trimerized acid) were obtained as the residue.

Acid equivalent weight: 281. Molecular weight: 562 (determined by recording the mass spectrum)

Manufacture of hydrogenated dimerized castor oil fatty acid.—144 g. of the dimerized castor oil fatty acid obtained above were hydrogenated at 60° C. under 60 atmospheres hydrogen pressure, using 10 g. of 10% strength palladium charcoal, until no further hydrogen absorption could be detected. The catalyst was then filtered off and the crude product was directly employed for the manufacture of the polyester.

(b) Manufacture of polyesters

Manufacture of polyester A.—130.5 g. of the hydrogenated dimerized castor oil fatty acid were mixed with 13.5 g. of butanediol-(1,4) (corresponding to a ratio of 4 equivalents of alcohol per 5 equivalents of dimerized fatty acid), and heated for 1¼ hours at 170° C. and for 4 hours to 200° C. After this time 5.3 g. of water had been split off. A brown-coloured polyester of low viscosity, having an acid equivalent weight of 1336 (determined by titration in tetrahydrofuran) was thereby obtained.

Manufacture of polyester B.—1132 g. of a dibasic acid manufactured by dimerization of oleic acid, having an average of 36 carbon atoms and an acid equivalent weight of 283 (obtainable from Emery Industries under the registered trade name "EMPOL 1014") were warmed to 148° C. under a nitrogen atmosphere with 189 g. of hexanediol-(1,6) (corresponding to a ratio of 4 equivalents of hexanediol per 5 equivalents of the dimerized fatty acid). The mixture was further warmed to 198° C. over the course of 7 hours while stirring and the water produced by the polycondensation was continuously distilled off. The last remnants of the water of condensation were removed by a vacuum treatment at 20 to 10 mm. Hg and 197° C. for one hour. The reaction product was a light yellow viscous liquid having an acid equivalent weight of 1575 (theoretical value 1594).

Manufacture of polyester C.—1132 g. of dimerized fatty acid (EMPOL 1014), which was used in the manufacture of polyester B. were warmed to 148° C. under a nitrogen atmosphere with 177 g. of hexanediol-(1,6) [corresponding to a ratio of 3 equivalents of hexanediol per 4 equivalents of the dimerized fatty acid]. The mixture was further warmed to 208° C. over the course of 4.5 hours while stirring and the water produced by the polycondensation was continously distilled off. The last remnants of the water of condensation were removed by vacuum treatment at 20 to 10 mm. Hg and 205° C. over the course of 1 hour. The reaction product was a light yellow viscous liquid having an acid equivalent weight of 1288 (theoretical value 1255).

Manufacture of polyester D.—572 g. of dimerized fatty acid (EMPOL 1014), which was used in the manufacture of polyester B, were warmed to 141° C. under a nitrogen atmosphere with 62 g. of ethylene glycol (corresponding to a ratio of 3 equivalents of glycol per 4 equivalents of dimerized fatty acid). The mixture was further warmed to 188° C. over the course of 6 hours while stirring and the resulting water was continuously distilled off. After a vacuum treatment over the course of 70 minutes at 188° C, a liquid which was light yellow and viscous at room temperature, having an acid equivalent weight of 935 (theoretical value 1432) was obtained.

Manufacture of polyester E.—1144 g. of dimerized fatty acid (EMPOL 1014) having an acid equivalent weight of 286 g. were warmed to 152° C. under a nitrogen atmosphere with 157 g. of hexanediol-(1,6) [corresponding to a ratio of 2 equivalents of alcohol per 3 equivalents of dimerized fatty acid]. The mixture was further warmed to 218° C. over the course of 2.5 hours while stirring, with the water resulting from the polycondensation being distilled off continuously. The last remnants of water were removed by a vacuum treatment at 20 to 12 mm. Hg and 218° C. The reaction product was a light yellow viscous liquid having an acid equivalent weight of 909 (theoretical value 990).

Manufacture of polyester F.—590 g. of a polycarboxylic acid manufactured by dimerization of oleic acid, having an acid equivalent weight of 295 (containing 75% of dimerized and 25% of trimerized acid, registered trade name "EMPOL 1024") were warmed to 160° C. under a nitrogen atmosphere with 118 g. of hexanediol-(1,6) [corresponding to a ratio of 3 equivalents of fatty acid per 2 equivalents of hexanediol]. The mixture was further warmed to 170° C. over the course of 6 hours while stirring, with the water produced by polycondensation being distilled off continuously, and was subsequently subjected to a vacuum of 175° C. and 14 mm. Hg over the course of 40 minutes. The resulting polyester was a light yellow liquid which was viscous at room temperature and had an acid equivalent weight of 905 (theoretical value 968).

Manufacture of polyester G.—516.6 g. (0.9 mol) of dimerized fatty acid (EMPOL 1014) having an acid equivalent weight of 287 were mixed with 54.7 g. (0.85 mol+3.8% excess) of ethylene glycol (corresponding to a ratio of dicarboxylic acid:glycol=18:17) and heated to 160° C. for 56 hours. For the last 3 hours of this total reaction time the reaction was allowed to go to completion under a waterpump vacuum. A light brown viscous polyester having an acid equivalent weight of 5375 (theoretical value 5387) was obtained.

Manufacture of polyester H.—516.6 g. (0.9 mol) of dimerized fatty acid (EMPOL 1014) having an acid equivalent weight of 287 were mixed with 51.1 g. (0.8 mol+3% excess) of ethylene glycol (corresponding to a ratio of dicarboxylic acid:glycol=9:8) and heated to 160° C. for 56 hours. After this reaction time the splitting off of water was complete. A light yellow viscous resin having an acid equivalent weight of 2563 (theoretical value 2687) resulted.

EXAMPLE 1

50 g. of the cycloaliphatic diepoxide compound of formula

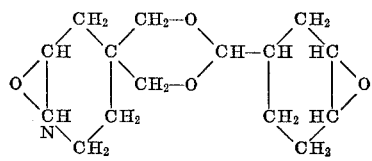

(=3′,4′-epoxyhexahydrobenzal - 3,4 - epoxycyclohexane-1,1-dimethanol), which was liquid and had an epoxide content of 6.2 epoxide equivalents/kg., together with 50 g. of polyester A were warmed to 140° C. in a nitrogen atmosphere over the course of 3 hours. The resulting adduct had an epoxide content of 2.62 epoxide equivalents/kg.

Cure 160 g. of the adduct were warmed to 110° C. with 46.2 g. of hexahydrophthalic anhydride (corresponding to 1.0 equivalent of anhydride per 1.0 equivalent of epoxide), and after adding 1 g. of a 6% strength solution of the sodium alcoholate of 3-hydroxymethyl-2,4-dihydroxypentane (subsequently referred to for brevity as "sodium hexylate") in 3 - hydroxymethyl - 2,4 - dihydroxypentane (subsequently referred to for brevity as "hexanetriol") the constituents were mixed, subjected to a short vacuum treatment to remove the air bubbles, and poured into aluminum moulds pre-warmed to 100° C. and treated with a silicone release agent, with 135 x 135 x 4 mm. sheets being manufactured for the determination of the flexural strength, deflection, impact strength and water absorption, identical sheets but of 3 mm. thickness for the measurement of the loss factor, and identical sheets of 1 mm. thickness for the shear modulus. The test specimens for the determination of the shear modulus and for the flexing and impact test were machined from the sheets, while for the tensile test (Examples 2 and thereafter) the appropriate test specimens according to DIN 16,946 or DIN 53,455, sample shape 2 (4 mm.) or VSM 77,101, FIG. 2 (4 mm. thick sample rod) were manufactured directly. After a heat treatment of 16 hours at 140° C. the following properties were measured on the mouldings:

Limiting fluxural stress according to VSM 77,103
    kg./mm.$^2$__ 5.1
Deflection according to VSM 77,103 _____mm__ >20
Impact strength according to VSM 77,105
    cm. kg./cm.$^2$__ 10
Dielectric loss factor tg δ (50 Hz.) at—
  20° C. _____ 0.008
  60° C. _____ 0.008
  100° C. _____ 0.009
  130° C. _____ 0.013
  160° C. _____ 0.024

EXAMPLE 2

400 g. of the cycloaliphatic diepoxide used in Example 1 together with 400 g. of polyester B were warmed to 140° C. over the course of 2 hours in a nitrogen atmosphere while stirring. The resulting adduct had an epoxide content of 2.85 epoxide equivalents/kg.

Cure (a) 350 g. of the adduct (1.0 equivalent) were thoroughly mixed with 139 g. (0.9 equivalent) of hexahydrophthalic anhydride and 13 g. of a 6% strength solution of "sodium hexylate" in "hexanetriol" at 100° C. and after a short vacuum treatment to remove the air bubbles were poured into the pre-warmed moulds according to Example 1. After a heat treatment of 16 hours at 140° C. the following properties were measured on the mouldings:

Limiting flexural stress according to VSM
  77,1103 _____kg./mm.$^2$__ 2.0
Deflection according to VSM 77,103 _____mm.___ >20
Impact strength according to VSM
  77,105 _____cm.kg./cm.$^2$__ >25
Tensile strength according to VSM
  77,101 _____kg./mm.$^2$ 1.7
Elongation at break according to VSM
  77,101 _____percent__ 22
Water absorption 24 hours, 20° C. _____do____ 0.12
Shear modulus G according to DIN 53,445 (dyne/cm.$^2$):
  −40° C. _____ 7×10$^9$
  −10° C. _____ 4×10$^9$
  +20° C. _____ 2.7×10$^9$
  80° C. _____ 1.4×10$^9$
  140° C. _____ 0.55×10$^9$ Dielectric loss factor tg. δ (50 Hz. at—

23° C. — 0.70×10⁻²
60° C. — 0.60×10⁻²
100° C. — 0.70×10⁻²

(b) When using 0.9 equivalent of methylnadic anhydride and otherwise the same composition and processing as in Example 2(a), the following properties were measured on the mouldings:

Limiting flexural stress according to VSM
77,103 _____ kg./mm.² __ 3.4
Deflection according to VSM 77,103 _____ mm __ >20
Impact strength according to VSM
77,105 _____ cm. kg./cm.² __ >25
Tensile strength according to VSM
77,101 _____ kg./mm.² __ 2.5
Elongation at break according to VSM
77,101 _____ percent __ 24
Water absorption 24 hours, 20° C. _____ do __ 0.11
Shear modulus G according to DIN 53,445 (dyne/cm.²)
−40° C. — 9.5×10⁹
−10° C. — 6.5×10⁹
+20° C. — 5.1×10⁹
80° C. — 2.9×10⁹
140° C. — 1.5×10⁹
Dielectric loss factor tg δ (50 Hz.) at—
23° C. — 0.60×10⁻²
80° C. — 0.60×10⁻²
100° C. — 0.80×10⁻²

(c) When using 0.9 equivalent of sebacic anhydride instead of hexahydrophthalic anhydride and otherwise the same composition and processing as in Example 2(a), the following properties were measured:

Tensile strength according to VSM
77,101 _____ kg./mm.² __ 0.25
Elongation at break according to VSM
77,101 _____ percent __ 21

The specimen shows rubber-elastic behavior and only slight strength. Curing with long-chain linear dicarboxylic acid anhydrides thus yields mouldings which cannot be compared with the mouldings manufactured according to the process of the invention.

EXAMPLE 3

1000 g. of the diepoxide compound of formula

[structural formula: (3',4'-epoxycyclohexylmethyl-3,4-epoxycyclohexanecarboxylate)]

(3',4' - epoxycyclohexylmethyl-3,4-epoxycyclohexanecarboxylate), which was liquid at room temperature and had an epoxide content of 7.1 epoxide equivalents/kg., together with 1000 g. of polyester C were warmed for 2 hours to 140° C. in a nitrogen atmosphere, while stirring. The resulting adduct had an epoxide content of 3.12 epoxide equivalents/kg.

Cure (a) 320 g. of the adduct (1.0 equivalent) were thoroughly mixed with 139 g. of hexahydrophthalic anhydride (0.9 equivalent) and 9.6 g. of a 6% strength solution of "sodium hexylate" in "hexanetriol" at 100° C. and after a short vacuum treatment the mixture was poured into the pre-warmed moulds according to Example 1. The following properties were measured on the mouldings:

Limiting flexural stress according to VSM
77,103 _____ kg./mm.² __ 4.9
Deflection according to VSM 77,103 _____ mm __ >20
Impact strength according to VSM
77,105 _____ cm. kg./cm.² __ >25
Tensile strength according to VSM
77,101 _____ kg./mm.² __ 3.2
Elongation at break according to VSM
77,101 _____ percent __ 7
Water absorption 48 hours, 20° C. _____ do __ 0.2
Dielectric loss factor tg δ (50 Hz.) at—
26° C. — 0.7×10⁻²
80° C. — 0.7×10⁻²
120° C. — 0.8×10⁻²
150° C. — 1.7×10⁻²
Shear modulus G according to DIN 53,445 (dyne/cm.²)
−40° C. — 7.8×10⁹
−10° C. — 5.55×10⁹
20° C. — 4.0×10⁹
80° C. — 2.4×10⁹
140° C. — 1.0×10⁹

(b) When using 0.9 equivalent of methylnadicanhydride instead of hexahydrophthalic anhydride and otherwise the same composition and processing as in Example 3 (a), the following properties were measured on the mouldings:

Limiting flexural stress according to VSM
77,103 _____ kg./mm.² __ 5.3
Deflection according to VSM 77,103 _____ mm __ 20
Impact strength according to VSM
77,105 _____ cm. kg./cm.² __ 21
Tensile strength according to VSM
77,101 _____ kg./mm.² __ 3.9
Elongation at break according to VSM
77,101 _____ percent __ 8
Dielectric loss factor tg δ (50 Hz.) at—
20° C. — 0.7×10⁻²
100° C. — 0.8×10⁻²
130° C. — 1.3×10⁻²
Shear modulus G according to DIN 53,445 (dyne/cm.²)
−40° C. — 8.4×10⁹
−10° C. — 5.1×10⁹
20° C. — 4.2×10⁹
80° C. — 2.0×10⁹
140° C. — 1.1×10⁹

COMPARISON EXAMPLE

Instead of 1000 g. of the cycloaliphatic diepoxide used in Example 3, an adduct was manufactured in the same manner from 1000 g. of a bisphenol-A-diglycidyl ether manufactured by condensation of epichlorhydrin with 2,2-bis(p-hydroxyphenyl)-propane (bisphenol A) in the presence of alkali, this bisphenol-A-diglycidyl ether being liquid at room temperature and having an epoxide content of 5.35 epoxide equivalents/kg. The resulting adduct was very cloudy and showed a distinct phase separation. In contrast to the adducts according to the invention, these adducts are not homogeneous and not storage-stable.

EXAMPLE 4

200 g. of polyether D together with 300 g. of the cycloaliphatic diepoxide used in Example 1 were warmed over the course of 3 hours to 140° C. while stirring and in a nitrogen atmosphere. The resulting adduct was light yellow and highly viscous and had an epoxide content of 2.56 epoxide equivalents/kg.

Cure 391 g. of the adduct (1.0 equivalent) were thoroughly mixed with 139 g. of hexahydrophthalic anhydride (0.9 equivalent) and 11.7 g. of a 6% strength solution of "sodium hexylate" in "hexane triol" at 110° C. and after a short vacuum treatment were poured into the prewarmed moulds according to Example 1. After a heat treatment of 16 hours at 140° C. the following properties were measured on the mouldings:

Limiting flexural stress according to VSM 77,103
kg./mm.² __ 6.0
Deflection according to VSM 77,103 _____ mm. __ >20
Impact strength according to VSM 77,105
cm. kg./cm.² __ >25
Tensile strength according to VSM 77,101
kg./mm.² __ 4.1
Elongation at break according to VSM 77,101
percent __ 10
Water absorption 24 hours, 20° C. ____ percent __ 0.13
Dielectric loss factor tg δ (50 Hz.) at—
  20° C. _____ 0.008
  60° C. _____ 0.012
  100° C. _____ 0.021
  170° C. _____ 0.038

EXAMPLE 5

1818 g. of polyester E together with 323 g. of the cycloaliphatic diepoxide used in Example 1 (corresponding to 2.2 equivalents of epoxide per 1.0 equivalent of acid) were warmed to 140° C. over the course of 3 hours under a nitrogen atmosphere. The resulting adduct was a liquid with an epoxide content of 0.95 epoxide equivalent/kg., which was light yellow and viscous at room temperature.

1053 g. (1 equivalent) of the adduct were warmed with 139 g. (0.9 equivalent) of hexahydrophthalic anhydride to 100° C. and after adding 5 g. of a 6% strength solution of "sodium hexylate" in "hexanetriol" the constituents were well mixed and subjected to a short vacuum treatment to remove the air bubbles. The mixture was poured into the prewarmed moulds according to Example 1. After a heat treatment of 16 hours at 140° C. the following properties were measured on the mouldings:

Tensile strength according to VSM 77,101
kg./mm.² __ 0.90
Elongation at break according to VSM 77,101
percent __ 73
Water absorption after 24 hours, 20° C.
percent __ 0.18
Dielectric loss factor tg δ (50 Hz.) at—
  20° C. _____ 0.016
  50° C. _____ 0.022
  110° C. _____ 0.032

EXAMPLE 6

1000 g. of polyester F together with 1000 g. of the cycloaliphatic diepoxide used in Example 1 were warmed to 140° C. over the course of 3 hours under a nitrogen atmosphere. The resulting adduct was highly viscous at room temperature and had an epoxide content of 2.45 epoxide equivalents/kg.

Cure 408 g. of the adduct (1.0 equivalent) were thoroughly mixed with 139 g. (0.9 equivalent) of hexahydrophthalic anhydride and 12 g. of a 6% strength solution of "sodium hexylate" in "hexanetriol" at 100° C., and after a short vacuum treatment the mixture was poured into the prewarmed moulds according to Example 1. After a heat treatment of 16 hours at 140° C. the following properties were measured on the mouldings:

Limiting flexural stress according to VSM 77,103
kg./mm.² __ 3.9
Deflection according to VSM 77,103 _____ mm. __ >20
Impact strength according to VSM 77,105
cm. kg./cm.² __ >25
Tensile strength according to VSM 77,101
kg./mm.² __ 3.9
Elongation at break according to VSM 77,101
percent __ 9

Dielectric loss factor tg δ (50 Hz.) at—
  20° C. _____ 0.01
  100° C. _____ 0.01
  140° C. _____ 0.02

EXAMPLE 7

1000 g. of polyester G and 1000 g. of the cycloaliphatic diepoxide used in Example 3 together with 2 g. of a 6% strength solution of "sodium hexylate" in "hexanetriol" were warmed to 140° C. over the course of 3 hours in a nitrogen atmosphere, while stirring. The adduct manufactured in this manner had an acid equivalent weight of over 100,000 and an epoxide content of 3.5 epoxide equivalents/kg.

Cure (a) 286 g. (=1.0 equivalent) of adduct together with 178 g. of methylnadicanhydride were warmed to 120° C. After adding 2 g. of a 6% strength solution of "sodium hexylate" in "hexanetriol" the mixture was well stirred, subjetced to a vacuum treatment and poured into the prewarmed moulds according to Example 1. After a heat treatment of 16 hours at 140° C. moulding having the following properties were obtained:

Limiting flexural stress according to VSM 77,103
kg./mm.² __ 1.4
Deflection according to VSM 77,103 _____ mm. __ >15
Impact strength according to VSM 77,105
cm. kg./cm.² __ 20
Tensile strength according to VSM 77,101
kg./mm.² __ 1.4
Elongation at break according to VSM 77,101
percent __ 9
Water absorption after 24 hours, at 20° C.
percent __ 0.25
Dielectric loss factor tg δ (50 Hz.) at—
  20° C. _____ 0.006
  80° C. _____ 0.007
  120° C. _____ 0.023
  160° C. _____ 0.092

(b) When using 1.0 mol of dodecenylsuccinic anhydride (=266 g.) and otherwise the same composition and processing as in Example 7(a), mouldings having the following properties were obtained:

Limiting flexural stress according to VSM 77,103
kg./mm.² __ 2.9
Deflection according to VSM 77,103 _____ mm. __ >20
Impact strength according to VSM 77,105
cm. kg./cm.² __ 32
Tensile strength according to VSM 77,101
kg./mm.² __ 2.3
Elongation at break according to VSM 77,101
percent __ 10
Water absorption after 24 hours, at 20° C.
percent __ 0.1
Dielectric loss factor tg δ (50 Hz.) at—
  20° C. _____ 0.009
  80° C. _____ 0.011
  120° C. _____ 0.025
  160° C. _____ 0.017

EXAMPLE 8

1000 g. of polyester H and 1000 g. of the cycloaliphatic diepoxide used in Example 3 together with 2 g. of a 6% strength solution of "sodium hexylate" in "hexanetriol" were warmed to 140° C. over the course of 3 hours in a nitrogen atmosphere, while stirring. The adduct manufactured in this way had an acid equivalent weight of over 10,000 and an epoxide content of 3.3 epoxide equivalent/kg.

Cure (a) 307 g. (=1.0 equivalent) of adduct were warmed to 110° C. with 178 g. (=1.0 mol) of methylnadicanhydride, treated with 2 g. of a 6% strength solution of "sodium hexylate" in "hexanetriol" and thoroughly mixed. After a brief vacuum treatment the mixture was poured into the prewarmed moulds according to Example 1. After a heat treatment of 16 hours at 140° C. the following properties were measured on the mouldings:

| | |
|---|---|
| Flexural strength according to VSM 77,103 kg./mm.² | 3.7 |
| Deflection according to VSM 77,103 mm. | >15 |
| Impact strength according to VSM 77,105 cm. kg./cm.² | 27 |
| Tensile strength according to VSM 77,101 kg./mm.² | 3.0 |
| Elongation at break according to VSM 77,101 percent | 7.8 |
| Water absorption after 24 hours, at 20° C. percent | 0.21 |
| Dielectric loss factor tg δ (50 Hz.) at— | |
| 20° C. | 0.006 |
| 80° C. | 0.007 |
| 120° C. | 0.011 |
| 160° C. | 0.032 |

(b) When using 1.0 mol of dodecenylsuccinic anhydride (=266 g.) and otherwise the same composition and processing as in Example 7(a), mouldings with the following properties were obtained:

| | |
|---|---|
| Limiting flexural stress according to VSM 77,103 kg./mm.² | 3.1 |
| Deflection according to VSM 77,103 mm. | 20 |
| Impact strength according to VSM 77,105 cm. kg./cm.² | 27 |
| Tensile strength according to VSM 77,101 kg./mm.² | 2.6 |
| Elongation at break according to VSM 77,101 percent | 8.4 |
| Water absorption after 24 hours, at 20° C. percent | 0.13 |
| Dielectric loss factor tg δ (50 Hz.) at— | |
| 20° C. | 0.009 |
| 80° C. | 0.011 |
| 120° C. | 0.025 |
| 160° C. | 0.014 |

The impact-resistant and flexible mouldings described in Examples 7(b) and 8(b) show extraordinarily low dielectric losses even at high temperatures (160° C.).

We claim:

1. An adduct, containing epoxide groups, from (1) a cycloaliphatic polyepoxide which possesses at least one 1,2-epoxide group located on a carbocyclic five-membered or six-membered ring, and (2) 0.1 to 0.5 carboxyl group equivalents per 1 epoxide group equivalent of the polyepoxide compound (1) of an acid polyester of formula

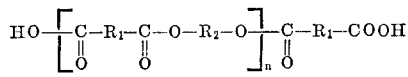

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 14 to 24 carbon atoms in the molecule, and a saturated aliphatic-cycloaliphatic higher dicarboxylic acid which has been manufactured by dimerization of unsaturated monomeric fatty acid having 14 to 24 carbon atoms in the molecule and subsequent hydrogenation of such a dimeric fatty acid, $R_2$ denotes the residue of an aliphatic diol obtained by separating off the two hydroxyl groups and $n$ denotes an integer from 1 to 20.

2. An adduct, containing epoxide groups, from (1) a cycloaliphatic polyepoxide which possesses at least one 1,2-epoxide group located on a carbocyclic five-membered or six-membered ring, and (2) 0.2 to 0.4 carboxyl group equivalents per 1 epoxide group equivalent of the polyepoxide compound (1) of an acid polyester of formula

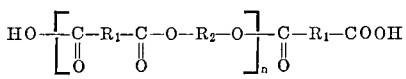

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 14 to 24 carbon atoms in the molecule, and a saturated aliphatic-cycloaliphatic higher dicarboxylic acid which has been manufactured by dimerization of unsaturated monomeric fatty acid having 14 to 24 carbon atoms in the molecule and subsequent hydrogenation of such a dimeric fatty acid, $R_2$ denotes the residue of an aliphatic diol obtained by separating off the two hydroxyl groups and $n$ denotes an integer from 1 to 20.

3. An adduct, containing epoxide groups, from (1) a cycloaliphatic polyepoxide which possesses at least one 1,2-epoxide group located on a carbocyclic five-membered or six-membered ring, and (2) 0.1 to 0.5 carboxyl group equivalents per 1 epoxide group equivalent of the polyepoxide compound (1) of an acid polyester of formula

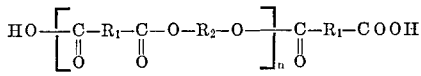

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 16 to 18 carbon atoms in the molecule, and a saturated aliphatic-cycloaliphatic higher dicarboxylic acid which has been manufactured by dimerization of unsaturated monomeric fatty acid having 16 to 18 carbon atoms in the molecule and subsequent hydrogenation of such a dimeric fatty acid, $R_2$ denotes the residue of an aliphatic diol obtained by separating off the two hydroxyl groups and $n$ denotes an integer from 1 to 20.

4. An adduct, containing epoxide groups, from (1) a cycloaliphatic polyepoxide which possesses at least one 1,2-epoxide group located on a carbocyclic five-membered or six-membered ring, and (2) 0.1 to 0.5 carboxyl group equivalents per 1 epoxide group equivalent of the polyepoxide compound (1) of an acid polyester of formula

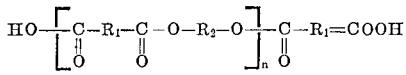

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 14 to 24 carbon atoms in the molecule and a saturated aliphatic-cycloaliphatic higher dicarboxylic acid which has been manufactured by dimerization of unsaturated monomeric fatty acid having 14 to 24 carbon atoms in the molecule and subsequent hydrogenation of such a dimeric fatty acid, $R_2$ denotes the residue of an aliphatic diol obtained by separating off the two hydroxyl groups and $n$ denotes an integer from 2 to 6.

5. An adduct, containing epoxide groups, from (1) a cycloaliphatic polyepoxide compound which possesses at least one 1,2-epoxide group located on a carbocyclic five-membered or six-membered ring, and (2) 0.2 to 0.4 carboxyl group equivalents per 1 epoxide group equivalent of the polyepoxide compound (1) of an acid polyester of formula

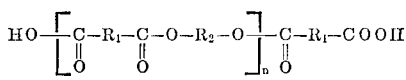

wherein $R_1$ denotes the hydrocarbon residue of a member selected from the group consisting of an unsaturated aliphatic-cycloaliphatic higher dicarboxylic acid which has been manufactured by dimerization of unsaturated monomeric fatty acid having 16 to 18 carbon atoms in the molecule, and a saturated aliphatic-cycloaliphatic higher dicarboxylic acid which has been manufactured by dimerization of unsaturated monomeric fatty acid having 16 to 18 carbon atoms in the molecule and subsequent hydrogenation of such a dimeric fatty acid, $R_2$ denotes the residue of an aliphatic diol obtained by separating off the two hydroxyl groups and $n$ denotes an integer from 2 to 6.

6. An adduct as claimed in claim 1 wherein the cycloaliphatic polyepoxide compound (1), on curing with carbocyclic carboxylic acid anhydride alone, yields a cured moulded material having a heat distortion point according to Martens DIN of at least 90° C.

7. An adduct as claimed in claim 1 wherein the cycloaliphatic polyepoxide compound (1), on curing with carbocyclic carboxylic acid anhydrides alone, yields a cured moulded material having a heat distortion point according to Martens DIN of at least 140° C.

8. An adduct as claimed in claim 1 wherein the polyepoxide compound (1) is a diepoxide of formula

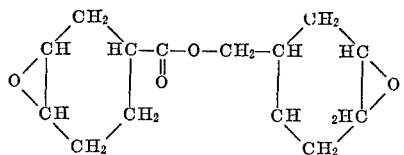

or of formula

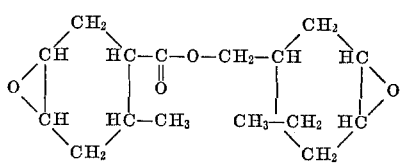

9. An adduct as claimed in claim 1, wherein the polyepoxide compound (1) is a diepoxide of formula

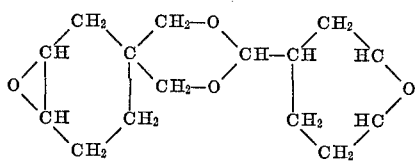

10. An adduct as claimed in claim 1, wherein the acid polyester (2) is obtained by reaction of dimerized fatty acid with aliphatic dihydric alcohol.

11. An adduct as claimed in claim 1, wherein the acid polyester (2) is derived from dimerized oleic acid, as the dimeric fatty acid.

12. An adduct as claimed in claim 1, wherein the acid polyester (2) is derived from dimerized castor oil fatty acid as the dimeric fatty acid.

13. An adduct as claimed in claim 1, wherein the acid polyester (2) is derived from ethylene glycol as the diol.

14. An adduct as claimed in claim 1, wherein the acid polyester (2) is derived from butanediol-(1,4) as the diol.

15. An adduct as claimed in claim 1 wherein the acid polyester (2) is derived from hexanediol-(1,6) as the diol.

16. A heat-curable composition of matter, comprising (a) an adduct containing epoxide group as claimed in claim 1, and (b) a carbocyclic polycarboxylic acid anhydride as the curing agent.

References Cited

UNITED STATES PATENTS

| | | | |
|---|---|---|---|
| 3,031,434 | 4/1962 | Radlove | 260—78.4 |
| 3,036,023 | 5/1962 | Rodgers et al. | 260—2.5 |
| 3,098,052 | 7/1963 | Schmitz et al. | 260—22 |
| 3,278,636 | 10/1966 | Wynstra | 260—835 |
| 3,390,108 | 6/1968 | Keck et al. | 260—75 |
| 3,405,102 | 10/1968 | Kugler et al. | 260—78.4 |
| 3,408,421 | 10/1968 | Kurka | 260—830 |
| 3,468,704 | 9/1969 | Graver | 260—22 |
| 3,529,034 | 9/1970 | Groff | 260—824 |
| 3,557,036 | 1/1971 | Schmid et al. | 260—22 |

DONALD E. CZAJA, Primary Examiner

R. W. GRIFFIN, Assistant Examiner

U.S. Cl. X.R.

117—161 K, 161 ZB; 260—22 D; 40 R, 835

UNITED STATES PATENT OFFICE
CERTIFICATE OF CORRECTION

Patent No. 3,642,674  Dated February 15, 1972

Inventor(s) ROLF SCHMID ET AL

It is certified that error appears in the above-identified patent and that said Letters Patent are hereby corrected as shown below:

Claim 4, column 16, amend the right-hand side of the structural formula to read:

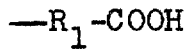

Claim 8, column 17, amend the right-hand side of the first structural formula to read:

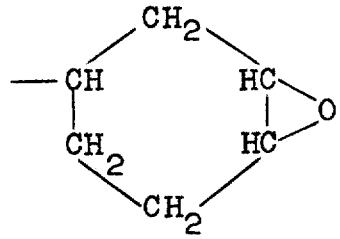

Claim 8, column 17, amend the right-hand side of the second structural formula to read:

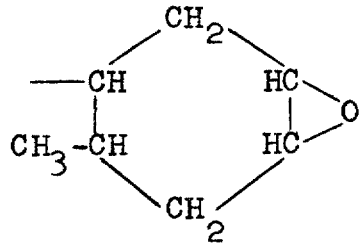

Signed and sealed this 18th day of July 1972.

(SEAL)
Attest:

EDWARD M. FLETCHER, JR.　　ROBERT GOTTSCHALK
Attesting Officer　　　　　　Commissioner of Patents